(12) United States Patent
Hardinge et al.

(10) Patent No.: US 9,276,738 B2
(45) Date of Patent: Mar. 1, 2016

(54) DIGITAL TACHOGRAPH

(75) Inventors: Charles Hardinge, Villingen (DE); Andreas Lindinger, Floezlingen (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 14/352,135

(22) PCT Filed: Oct. 20, 2011

(86) PCT No.: PCT/EP2011/068355
§ 371 (c)(1),
(2), (4) Date: Apr. 16, 2014

(87) PCT Pub. No.: WO2013/056740
PCT Pub. Date: Apr. 25, 2013

(65) Prior Publication Data
US 2014/0245017 A1    Aug. 28, 2014

(51) Int. Cl.
*G06F 21/64* (2013.01)
*H04L 9/08* (2006.01)
*G07C 5/08* (2006.01)
*H04L 9/32* (2006.01)

(52) U.S. Cl.
CPC ............ *H04L 9/0825* (2013.01); *G07C 5/08* (2013.01); *H04L 9/3247* (2013.01); *H04L 2209/84* (2013.01)

(58) Field of Classification Search
CPC . H04L 9/3247; H04L 63/0428; H04L 9/0825; H04L 63/123; H04L 2209/72; H04L 9/3242; H04L 9/3236; G06F 21/64
See application file for complete search history.

(56) References Cited

U.S. PATENT DOCUMENTS

| 5,956,408 | A | 9/1999 | Arnold |
| 8,484,475 | B2 | 7/2013 | Boehler et al. |
| 2005/0228998 | A1* | 10/2005 | Chan et al. ............ 713/175 |
| 2009/0327760 | A1 | 12/2009 | Lindinger et al. |
| 2010/0250053 | A1* | 9/2010 | Grill et al. ............. 701/33 |

FOREIGN PATENT DOCUMENTS

| DE | 197 10 393 A1 | 9/1998 |
| DE | 197 38 631 A1 | 3/1999 |
| DE | 100 32 301 A1 | 1/2002 |
| DE | 695 34 757 T2 | 8/2006 |
| DE | 10 2007 004 645 A1 | 7/2008 |
| DE | 10 2007 058 163 A1 | 4/2009 |
| DE | 10 2008 006 840 A1 | 8/2009 |

* cited by examiner

*Primary Examiner* — Izunna Okeke
(74) *Attorney, Agent, or Firm* — Cozen O'Connor

(57) ABSTRACT

A digital tachograph has a security module. A public key, a secure private key, and a signage are stored in the security module. Vehicle-relevant data and the corresponding checksum are encoded using a secure private key and stored in the digital tachograph in a data format by the security module.

6 Claims, 4 Drawing Sheets

DIGITAL TACHOGRAPH

CROSS-REFERENCE TO RELATED APPLICATION

This is a U.S. national stage of application No. PCT/EP2011/068355, filed on 20 Oct. 2011, the content of which is incorporated herein by reference.

BACKGROUND OF THE INVENTION

1. Field of the Invention

The invention relates to a digital tachograph and to a method for signing vehicle-relevant data.

2. Related Art

DE 197 38 631 A1 discloses a method and an arrangement for monitoring motor vehicles, wherein the motor vehicles contain a tachograph for ascertaining and storing a piece of journey-specific information and the stored pieces of information are checked, with the piece of information from an electronic tachograph being transmitted to a remote query module in the motor vehicle, the piece of information being transmitted to an external query appliance and the piece of information being conditioned and presented in the query appliance. The remote query module is intended to send only following a correct request by a query appliance.

A method and an appliance for documenting vehicle data are disclosed by DE 197 10 333 A1. This document proposes the vehicle data is collected by a data memory unit installed in the vehicle, conditioned and stored in a storage medium up until external processing. It is intended to be possible to store data on a chip card in encrypted form and to decrypt the data using an evaluation program.

DE 100 32 301 A1 discloses a travel data acquisition, travel data transmission and travel data output system for use in a public local or long-distance transport network with a travel data generator, a travel data transmitter and a travel data receiver. The travel data generator is intended to automatically capture and encode data from a respective vehicle, and the travel data transmitter is intended to transmit the travel data captured and encoded by the travel data generator.

According to European community regulations 2135/98, 1360/2002 and 3821/85, a digital tachograph needs to be shown for all commercial vehicles with a vehicle weight greater than 3.5 t and for certain buses on the registration date within EU member states from May 1, 2006 onward. The aim of digital tachographs is to combat simple opportunities for misuse in order to be able to undertake protected and confidential storage of these travel data on a personal driver card and in a mass memory in the appliance through the use of digital data processing. If necessary, the travel data can be printed. Digital tachographs need to be checked for functionality, and calibrated, at least every two years.

At present, it is possible for vehicle-relevant data that are recorded and ascertained by a digital tachograph, such as driving-period, to be manipulated, the manipulation not being evident to outside third parties, such as regulatory authorities. For the regulatory authorities, such as the police, this means that the vehicle-relevant data to be checked for a vehicle that is to be checked are unreliable, since it is not possible to check whether they are authentic and/or have not been manipulated.

The recorded vehicle-relevant data might have been changed, with it not being clearly evident what prompted the change, since it is not possible to distinguish whether mischievous manipulation, or incorrect information produced by transmission errors is involved. As a result, trustworthiness for rating the vehicle-relevant data can be classified as low.

Current "trust-based" solutions for the capture of vehicle-relevant data can be regarded as suspect for a check by the regulatory authorities. The existing legal regulations that identify the data attributes of the vehicle-relevant data that need to be captured and must not be changed provide no guidelines with regard to reliability against manipulation and hence no Q factor or quality indicator about the reliability of the data attributes of the vehicle-relevant data per se that need to be captured. Therein lies the opportunity to make unrecognizable modifications to the vehicle-relevant data. In the existing legal guidelines, the captured vehicle-relevant data are totally unprotected and can be regarded as not forgery-proof.

SUMMARY OF THE INVENTION

It is an object of the invention to provide a digital tachograph and a method for signing vehicle-relevant data that achieve a particular security level for the reliability of the captured vehicle-relevant data.

An aspect of the invention involves the digital tachograph having a public key infrastructure (PKI) as an integral and modular component. This design allows the vehicle-relevant data, that are to be captured to be digitally signed and hence processed in the vehicle in situ in a reliable and trustworthy manner. This reduces the likelihood that disadvantageous transmission errors or opportunities for manipulation could arise. This design of the digital tachograph makes it possible to prevent manipulation of the vehicle-relevant data even along the entire transmission and storage chain, and allows law enforcement agencies to access reliable vehicle-relevant data on this basis so that the vehicles can be checked in a legally proper manner and hence also without objection.

The digital tachograph according to an aspect of the invention has a very flexible modular design. This design ensures that the integrity and reliability of the vehicle-relevant data obtain. The main focus in this case is that authorities are able to access the vehicle-relevant data, which can be regarded as reliable, since a check for whether there are manipulations can take place and, as a result, there could be a legal violation by the driver. In addition, this design ensures that the authenticity of the vehicle-relevant data obtains, as a result of this it is possible to ensure that the ascertained vehicle-relevant data can also be attributed to the generating or causing driver. The digital tachograph according to an aspect of the invention advantageously also ensures a high level of data integrity, because a check to determine whether manipulations have been carried out is reproducible.

According to a first advantageous aspect; the digital tachograph has a security module SEC, and the security module SEC stores a public key PubK, a secure private key (PrivSecK) and a signature CA, wherein the security module. SEC encrypts vehicle-relevant data and the associated checksum with a secure private key (PrivSecK) in the digital tachograph and the data and checksum are stored in a data format in the security module SEC.

In a further aspect, the public key (PubK) and the secure private key (PrivSecK) are produced by the security module.

In a further aspect, the public key (PubK) is obtained from a server via the communication interface Com.

BRIEF DESCRIPTION OF THE DRAWINGS

Exemplary embodiments of the invention are shown in the drawings and are described in more detail below. In the drawings.

DETAILED DESCRIPTION OF THE PRESENTLY PREFERRED EMBODIMENTS

Figure 1:
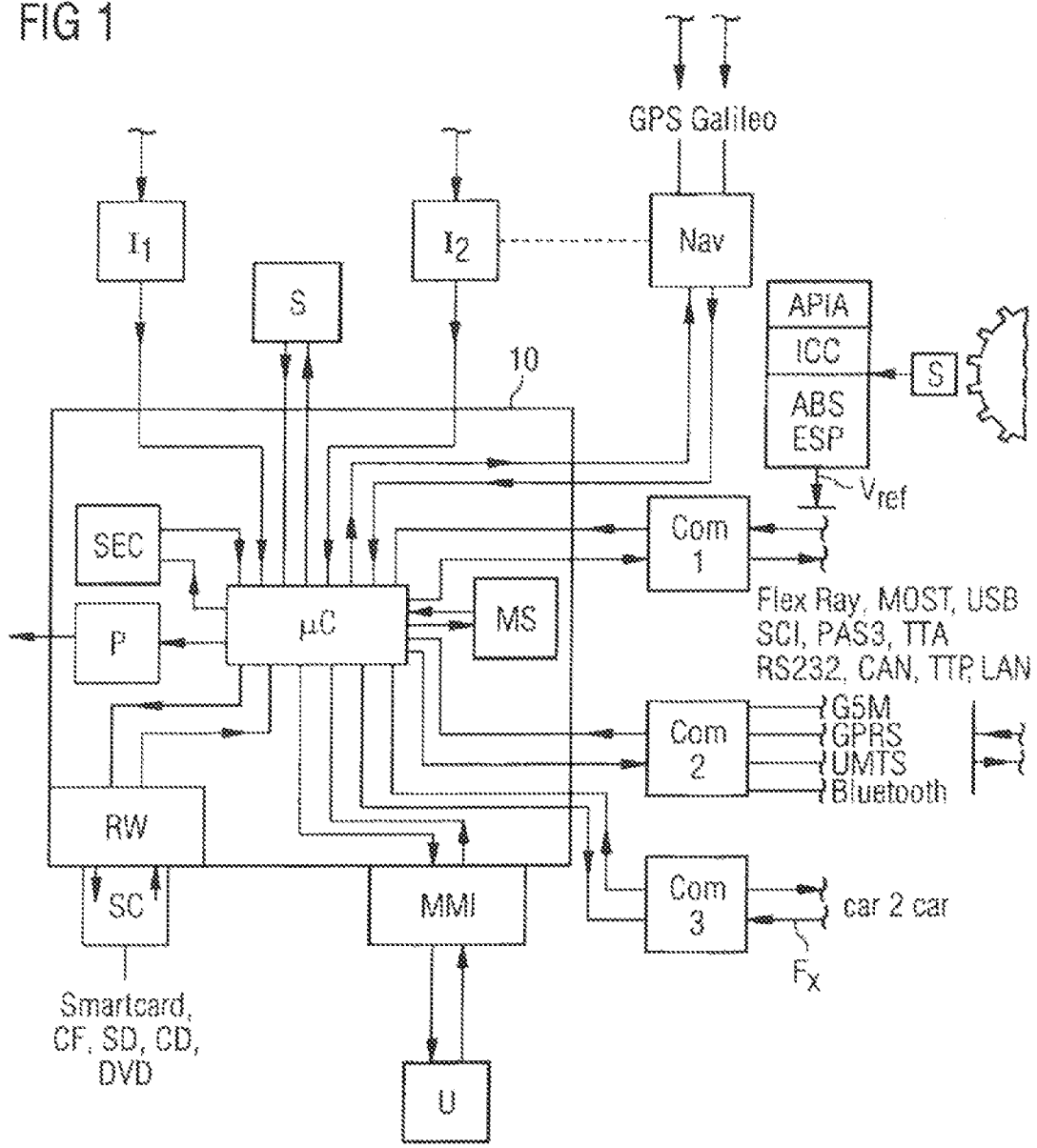
FIG. 1 shows a design for the digital tachograph.

The design and operation of the tachograph according to the invention are explained with reference to FIG. 1. The digital tachograph for a motor vehicle has a housing, as a result of which the appliance can easily be incorporated into the existing peripheral area of a motor vehicle or commercial vehicle toy connection using connector receptacles. In this case, the essential slots and interfaces and also connector interfaces for the supply of electric power by the vehicle onboard power supply system are situated on an appliance backplane, so that the necessary electrical connections are made or severed automatically upon mechanical insertion and removal.

The housing of the inspection appliance contains electronic components such as a microprocessor μC for editing and processing the vehicle-relevant data Fi, F1, F2, Fx and a connected mass memory MS, preferably of chip or hard disk type, having a data memory volume for one operating year, for example. A combined read/write unit RW allows communication with personalized, mobile data, storage media SC, such as particularly smartcard, compact flash, SD card, USB stick or, by way of example, CD/DVD with a data memory volume of approximately 1 to 30 operating days, for example. A printer unit P is preferably of thermal printer type and allows simple, preferably tabular, data output with an indication of system-relevant data (for example appliance No, date of manufacture, first startup, appointed calibration time, etc.) and also the data relevant to the vehicle (driver), particularly driving and rest periods, speed violation(s). In addition, the special security module Sec is used for encryption and decryption and ensures that a security concept is observed.

The digital tachograph has an encrypted connection to a largely standardised pulse generator that preferably senses a piece of rotation information from a significant shaft in the drive train of a motor vehicle. On the basis of a frequency, which is obtained from the pulses, it is possible to ascertain vehicle travel data F1, such as particularly the instantaneous speed of travel v or length of driving period, which can be stored and output progressively for documentation purposes for a tachograph, in correlation, with a piece of internal appliance time information.

The inspection appliance has at least one suitable man/machine interface MMI, which is preferably in the form of a touchscreen and is used for data input and data output both for display purposes and for more universal operator control purposes—possibly also for other appliances, such as particularly on a navigation unit Nav. In this context, it should be mentioned that, depending on the configuration of the digital tachograph according to the invention, the digital tachograph comprises the security module Sec, which may have a dedicated microprocessor, or can access the microprocessor μC in the manner of a distributed system. In principle, any communication that crosses a housing boundary is encrypted in order to prevent misuse of data.

Figure 2:
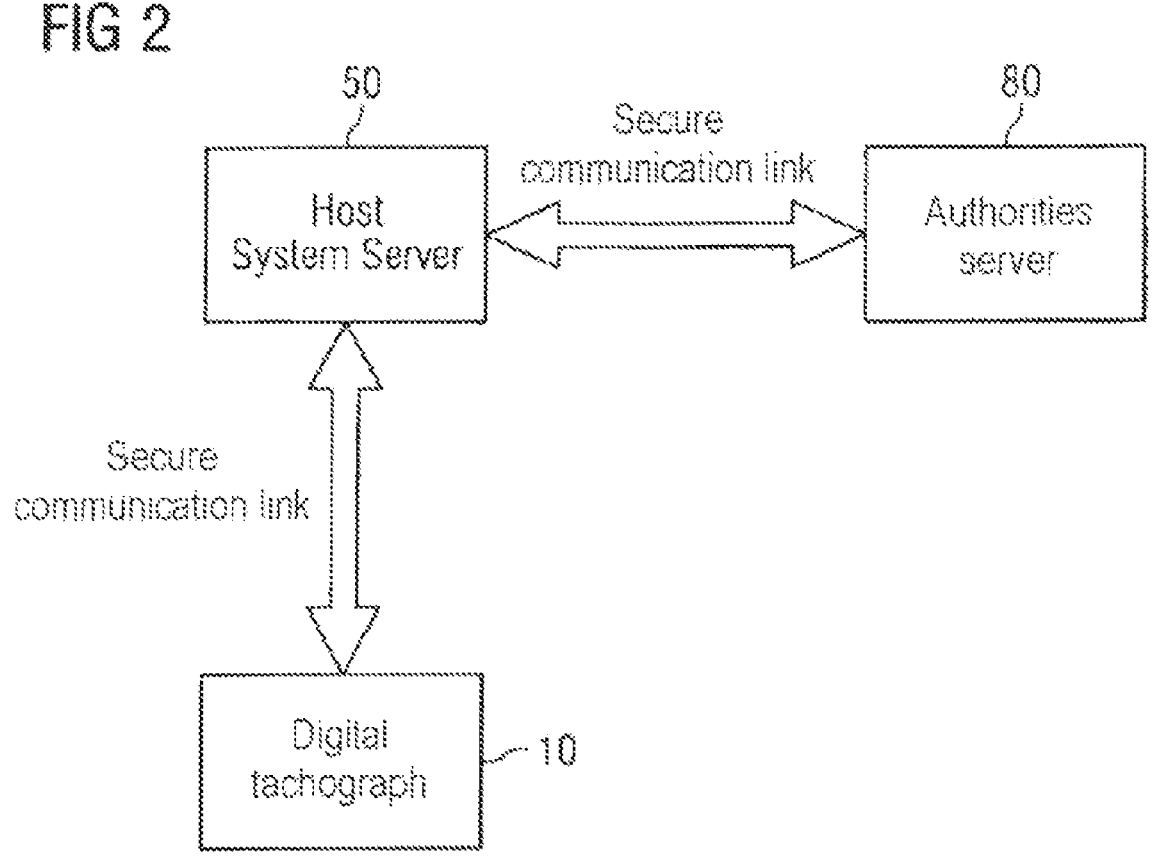
FIG. 2 shows transmission paths and manipulation locations for the vehicle-relevant data.
Figure 3:
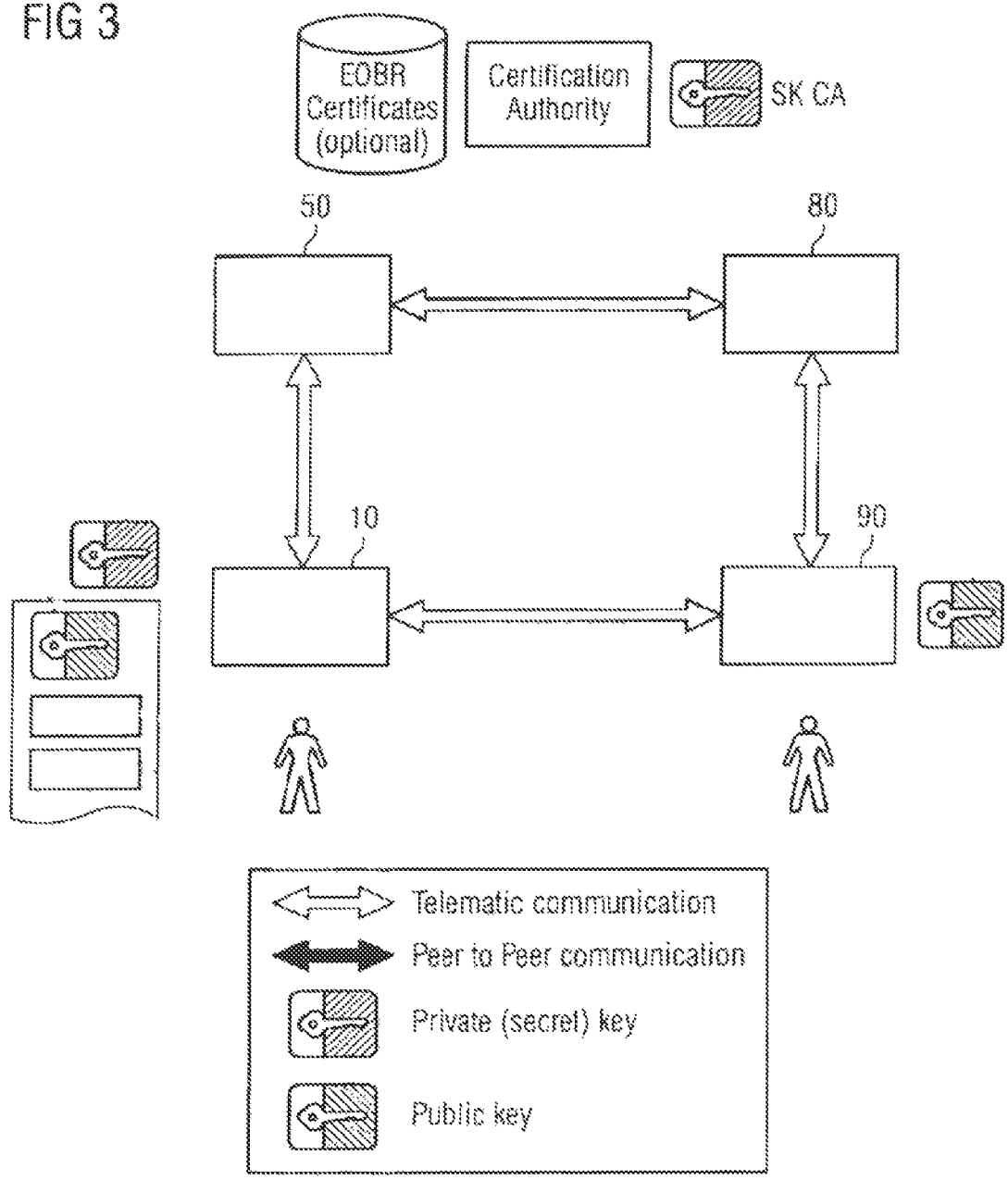
FIG. 3 shows transmission paths for the keys produced.

A main focus of an aspect of the invention is, as shown in FIG. 2, not that the entire transmission path needs to be checked for safety-relevant alteration or manipulations and thereby protected, but rather that the digital tachograph can be used to protect the actual vehicle-relevant data, which means that a lower level of complexity can be observed. One important aspect that arises as a result is the associated lower costs and expenses. Possible locations at which manipulations could be encountered are, as FIG. 2 shows, the digital tachograph 10 itself, a host system server 50 and an authorities server 80. In the case of the last two servers, the signed data are loaded, so that an authority or the police can retrieve vehicle-relevant data stored during an inspection in order to be able to perform, a legally effective check. Access to these data can be effected by a peer-to-peer connection or by a telecommunication link as indicated in FIG. 3. In this case, the vehicle-relevant data can be accessed on the host system server 50 or the authorities server 80 or on the digital tachograph 10.

Figure 4:
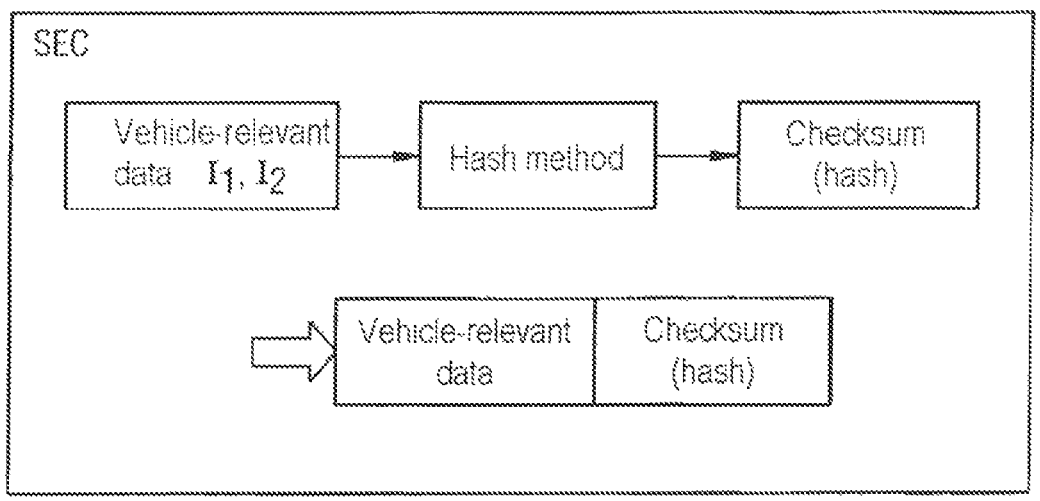
FIG. 4 shows an encryption process in the security module.

According to the invention, the vehicle-relevant data are electronically signed in the security module Sec, as indicated in FIG. 4. If the vehicle-relevant data need to be electronically signed, a checksum (hash value) is formed using these data, for example using the algorithm SHA-256, and then is signed with the private key of the digital tachograph (PriSecK) as a certificate holder. The signature algorithm, used in this case is the RSA algorithm, for example, although it is also possible to use other representatives of asymmetric encryption. In technical terms, the process of signature generation corresponds to the encryption of the calculated hash value using the private key of the digital tachograph (PrivSecK) with an asymmetric algorithm.

In this connection, it is important that, conversely with respect to the encryption for producing a signature, the secure private key (PrivSecK) is used for production and the public key (PubK) is need for checking. This makes sense because the signature is produced exclusively by the holder of the private key, and hence the digital tachograph, hut is intended to be checked by any receiver, such as the authorities charged with checking of the signed vehicle-relevant data.

For the check by the authorities, the electronic signature of the vehicle-relevant data is recalculated in a first step by the checksum, of the encrypted vehicle-relevant data. In a second step, the public key (PubK) of the signature certificate used is used, to "decrypt" the signature. The result of this process is again the checksum (hash value) of the vehicle-relevant data, as calculated during signature production. In order to establish the correctness of the signature, the original hash value of the vehicle-relevant data is then finally compared with the hash value calculated during the signature check. If the two checksums are identical, the vehicle-relevant datum has not been altered, and the signature is cryptographically correct.

In order to perform the signature check completely, it is also necessary to check the validity of the certificate used and of the certificate chain. To this end, in one embodiment, the check against revocation lists and the online status query axe available as a possible implementation. Whereas the check on the basis of a revocation list is a check against a negative list that involves the certificate serial numbers of revoked certificates being published in a revocation list, the online status query (OCSP) is a positive query via the Com interfaces of the digital tachograph that involves the certificate issuer (CA) providing information about whether the certificate is valid or revoked.

So that the security module according to the invention can produce the cited, encryptions and signatures, it is absolutely necessary for each security module of the digital tachograph to have an asymmetric hey pair, namely with a secure private hey (PrivSecK) and a public key (PubK). The asymmetric key pairs need to be managed by an authority device, and this needs to have the knowledge that the asymmetric key pairs are reliable and genuine and can be attributed to the respective digital tachograph.

The secure private key (PrivSecK) is stored in the security module reliably and in a manner protected against access from, the outside. The public key (PubK) can likewise be stored, but provision is made for the Com interfaces of the digital tachograph to be able to be used to obtain the public key (PubK), as a result of which it is not absolutely necessary for the key to be securely stored in the security module of the digital tachograph.

In one embodiment, the security module SEC of the digital tachograph receives the public key (PubK) and the secure private key from, an environment (trust center) that is monitored by the authorities and produced therein. In this case, no hardware of the digital tachograph is used for generating the asymmetric key pairs. In this regard, the authority is sent the certification data, such as serial number, company identification and the secure private key (PrivSecK), via the Com interfaces in order to issue a certificate for the respective digital tachograph so that this authority can produce the relevant key pairs. The secure private key (PrivSecK) is stored in the security module reliably and in a manner protected against access from the outside.

In a further advantageous embodiment, the asymmetric keys are produced by the security module of the digital tachograph itself. The public key (PubK) is, as FIG. 3 shows, sent to the authority with the relevant certification data via the Com interface. The relevant certificate is returned by the authority and stored in the security module SEC. This approach greatly reduces the level of security requirements, since the secure private hey (PrivSecK) can never be disclosed to the outside, since it is only formed internally in the security module (SEC) and is not rendered visible to the outside.

In a further embodiment, the communication interfaces Com1, Com2 or Com3 are used to generate a connection to a host system server 50. The host system, server 50 loads a piece of software that allows asymmetric key pairs to be generated reliably and securely in the security module SEC of the digital tachograph 10. In a second communication link, which needs to be secure and reliable against attacks by third parties, a management server 90 for the digital, tachograph loads the certification data, onto the digital tachograph. The digital tachograph then uses the security module to calculate the relevant asymmetric key pair. Subsequently, the public key (PubK) produced is transmitted to the host system server 50, and the latter then sends the certificate to the certification center.

In order to protect the public key (PubK) and the secure private key (PrivSecK) as appropriate, the invention envisages the security module being of hardware design in order to be able to ascertain access operations from the outside. It is also possible for a pure software solution to be envisaged, in which case there needs to be manipulation tracking for the security module. It is also proposed that a combined hardware and software solution be able to be used that is dependent on the scope of functions of the operating system of the digital tachograph.

Any digital tachograph provides, for data storage, a data format that can record the vehicle-relevant data and the signatures in order to be able to perform a location-independent check on the signed data. For this purpose, the signed vehicle-relevant data need to be reliably restored using the relevant key.

For this reason, the method according to the invention envisages the relevant start and end times being ascertained at the start and end of the method, this corresponding to the period of time in which the vehicle-relevant data are protected by a single digital signature. This session can be started by driver login, the driving of the vehicle or by specific prerequisites of the digital tachograph, such as memory limits.

This session can be ended by driver logout, change of day, output of the vehicles-relevant data and the relevant signatures or by specific prerequisites of the digital tachograph, such as service intervals to be observed. For this reason, the invention proposes that the data format that should be produced during the processing of the vehicle-relevant data have the indicated structure.

| Data element | Data element definition | Type | Length | Designation |
|---|---|---|---|---|
| Digital tachograph ID | Unique ID for the DTO—same ID as in the certificate. | N | | Yes |
| Session start | Date and time of start | N | 15 | Yes |
| Session end | Date and time of end | N | 15 | Yes |
| Digital signature | ASCII representation of the digital signature from all the relevant data elements, since the last digital signature, that have been recorded | A | | No |
| Certificates | ASCII representation of the DTO public key certificate | A | | No |
| Record signed | Representation of whether or not the record of the data has been recorded (optionally dependent on memory model) | A | 1 | |

The indicated structure allows data elements that need to be used for calculating the signature to be identified exactly. The effect achieved by this is that not all data are used for signing, and hence the aim of the police being able to access the vehicle-relevant data flexibly and reliably, and the signature involvement with the security module Sec of the digital tachograph being reduced, while simultaneously achieving logic that allows the authorities or the police to specifically access data and certificates that need to be decrypted.

For this reason, the method of signing indicated in FIG. 4 is implemented in embedded form. This means that, when a new signing process is started, the start time and the end time are captured with a date and a time of day. Each signing process also captures the explicit identification of the digital tachograph, as a data element. The digital signing is calculated for all vehicle-relevant data that are signed between the start and the end. The digital signature is stored after the end datum. The certificate of the digital tachograph with the public key (PubK) and the secure private key (PrivSecK) are stored after the digital signature.

Start
    Original data record 1
    Original data record 2
    Original data, record 3
    Original data record 4
    Original data record 5
End
Signature
Certificates
    Annotated data record 2
    Annotated data record 4.

From this it can be seen that only the data indicated in italics have been subjected to signing or signed. An important effect in the case of such a design of the data structure is that during a check the respective data elements that represent the vehicle-relevant data in signed form are separated, and a simple checking process by the authorities is permitted.

The data structure below indicates that signed and annotated vehicle-relevant data are stored in interleaved form, with only the data elements indicated in italics having been signed.

Start
   Original data record 1
   Original data record 2
   Annotated data record 2
   Original data record 3
   Original data record 4
   Annotated data record 4
   Annotated data record 4
   Original data record 5
End
Signature
Certificates.

This interleaved data structure allows optimized data storage to be achieved.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform, substantially the same function in substantially the same way to achieve the same results are within the scope of the invention. Moreover, it should be recognised that structures and/or elements and/or method steps shown and/or described in connection with any disclosed form, or embodiment of the invention may be incorporated in any other disclosed or described, or suggested form, or embodiment as a general matter of design choice. It is the intention, therefore, to be limited only as indicated by the scope of the claims appended hereto.

The invention claimed is:

1. A digital tachograph (10), comprising:
   a communication interface; and
   a security module (SEC), the security module (SEC) storing a public key (PubK), a secure private key (PrivSecK) and a signature (CA),
   wherein the security module (SEC) is configured to encrypt vehicle-relevant data (Fi) and an associated checksum with a secure private key (PrivSecK) in the digital tachograph and said data and checksum are stored in a data format in the security module (SEC),
   wherein the digital tachograph is configured to:
     check the validity of the public key (PubK) and the secure private key (PrivSecK) based on information relating to whether the public key (PubK) and/or the secure private key (PrivSecK) have been revoked;
     decrypt, by the public key (PubK), the digital signature;
     calculate a first checksum;
     compare the first checksum and a checksum of the signature;
     check the signature of the vehicle-relevant data using the public key (PubK) to decrypt the digital signature;
     use the public key (PubK) of the digital tachograph to decrypt the checksum of the signature;
     calculate a third checksum; and
     compare the third checksum and the decrypted checksum of the signature
   wherein relevant start and end times of a session are ascertained corresponding to a period of time in which the vehicle-relevant data (Fi) are protected by a single digital signature, the start time of the session being ascertained by one or more from the group consisting of: driver login, driving of the vehicle and specific prerequisites of the digital tachograph and the end time of the session being ascertained by one or more from the group consisting of: driver logout, change of day, output of the vehicle-relevant data and by specific prerequisites of the digital tachograph.

2. The digital tachograph (10) as claimed in claim 1, wherein the public key (PubK) and the secure private key (PrivSecK) are generated by the security module.

3. The digital tachograph (10) as claimed in claim 1, wherein the public key (PubK) is obtained from a server (50, 80) via the communication interface.

4. A method for signing vehicle-relevant data on a digital tachograph, the method comprising:
   a security module (SEC) of the digital tachograph storing a public key (PubK) and a secure private key (PrivSecK);
   processing the vehicle-relevant data using a hash method;
   calculating a checksum;
   jointly encrypting the checksum and the vehicle-relevant data with the secure private key (PrivSecK) of the digital tachograph stored in the security module (SEC), by asymmetric encryption to produce a digital signature;
   checking the validity of the public key (PubK) and the secure private key (PrivSecK) based on information relating to whether the public key (PubK) and/or the secure private key (PrivSecK) have been revoked;
   decrypting, by the public key (PubK), the digital signature;
   calculating a first checksum;
   comparing the first checksum and a checksum of the signature;
   checking the signature of the vehicle-relevant data using the public key (PubK) to decrypt the digital signature;
   using the public key (PubK) of the digital tachograph to decrypt the checksum of the signature;
   calculating a third checksum; and
   comparing the third checksum and the decrypted checksum of the signature,
   wherein relevant start and end times of a session are ascertained corresponding to a period of time in which the vehicle-relevant data are protected by a single digital signature, the start time of the session being ascertained by one or more from the group consisting of: driver login, driving of the vehicle and specific prerequisites of the digital tachograph and the end time of the session being ascertained by one or more from the group consisting of: driver logout, change of day, output of the vehicle-relevant data and by specific prerequisites of the digital tachograph.

5. The method as claimed in claim 4, wherein the hash method is effected on the basis of at least one from the group consisting of MD5, SHA1, SHA2 hash generation methods.

6. The method as claimed in claim 5, further comprising:
   validating the public key (PubK) of the digital tachograph; and
   checking the signature of the vehicle-relevant data.

* * * * *